United States Patent
Chu (10) Patent No.: US 12,551,182 B2
(45) Date of Patent: Feb. 17, 2026

(54) PET-DATA CORRECTION METHOD AND DEVICE, COMPUTER APPARATUS, AND PET-IMAGE RECONSTRUCTION METHOD

(71) Applicant: SHANGHAI UNITED IMAGING HEALTHCARE CO., LTD., Shanghai (CN)

(72) Inventor: Shao-Ping Chu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 237 days.

(21) Appl. No.: 18/276,257

(22) PCT Filed: Feb. 8, 2022

(86) PCT No.: PCT/CN2022/075457
§ 371 (c)(1),
(2) Date: Aug. 8, 2023

(87) PCT Pub. No.: WO2022/166976
PCT Pub. Date: Aug. 11, 2022

(65) Prior Publication Data
US 2024/0122567 A1    Apr. 18, 2024

(30) Foreign Application Priority Data
Feb. 8, 2021 (CN) .......................... 202110171084.5

(51) Int. Cl.
*A61B 6/00*    (2024.01)
*A61B 6/03*    (2006.01)
(Continued)

(52) U.S. Cl.
CPC ............ *A61B 6/5282* (2013.01); *A61B 6/037* (2013.01); *G01T 1/20* (2013.01); *G01T 1/2985* (2013.01); *G06T 11/005* (2013.01)

(58) Field of Classification Search
CPC ..... A61B 6/5283; A61B 6/037; A61B 6/5205; A61B 6/5211
See application file for complete search history.

(56) References Cited

U.S. PATENT DOCUMENTS 8,866,087 B2 * 10/2014 Pistorius ............... G01T 1/2985
250/363.04
12,318,232 B2 * 6/2025 Qi .......................... G01T 1/1641
(Continued)

FOREIGN PATENT DOCUMENTS

CN    102970935 A       3/2013
CN    103164863 A  *    6/2013
(Continued)

OTHER PUBLICATIONS

European Search Report (EP Application No. 22749255.0), dated Jun. 24, 2024, 7 pages.
(Continued)

*Primary Examiner* — Casey Bryant (57) ABSTRACT

A PET-data correction method, a PET-data correction device, a computer apparatus, and a PET-image reconstruction method. The PET data correction method includes: acquiring single-events during a PET scan, the single-event including a non-scattering event and a scattering event (S101); obtaining a first correction parameter of the non-scattering event, and correcting the non-scattering event according to the first correction parameter (S102); obtaining scattering features of the scattering event, and classifying the scattering event based on the scattering features (S103); and obtaining a second correction parameter of the scattering event of each different classification, and correcting the scattering event according to the second correction parameter (S104). By means of the PET-data correction method, a reconstruction result is more accurate, and an imaging effect is better.

13 Claims, 3 Drawing Sheets

(51) Int. Cl.
    *G01T 1/20*     (2006.01)
    *G01T 1/29*     (2006.01)
    *G06T 11/00*     (2006.01)

(56) References Cited

U.S. PATENT DOCUMENTS

| | | | |
|---|---|---|---|
| 2012/0061576 A1* | 3/2012 | Degenhardt | G01T 1/20183 250/362 |
| 2014/0241505 A1 | 8/2014 | Xu et al. | |
| 2015/0192685 A1 | 7/2015 | Griesmer et al. | |
| 2015/0289825 A1 | 10/2015 | Lage et al. | |
| 2017/0086757 A1 | 3/2017 | Rong et al. | |
| 2020/0151918 A1* | 5/2020 | Watson | G01T 1/2985 |
| 2020/0273214 A1 | 8/2020 | Xu et al. | |

FOREIGN PATENT DOCUMENTS

| | | |
|---|---|---|
| CN | 104508513 A | 4/2015 |
| CN | 103164863 B | 3/2016 |
| CN | 106491153 A | 3/2017 |
| CN | 109009199 A | 12/2018 |
| CN | 109658472 A | 4/2019 |
| CN | 109875592 A | 6/2019 |
| CN | 110063742 A | 7/2019 |
| CN | 110327067 A | 10/2019 |
| CN | 110660111 A | 1/2020 |
| CN | 110934604 A | 3/2020 |
| CN | 111670462 A | 9/2020 |
| CN | 111714147 A | 9/2020 |
| CN | 112053411 A | 12/2020 |
| CN | 112998732 A | 6/2021 |
| CN | 118266961 A * | 7/2024 .......... A61B 6/4241 |
| JP | 2008000190 A | 1/2008 |
| JP | 2018044952 A | 3/2018 |
| JP | 2020064045 A | 4/2020 |
| JP | 2020190446 A | 11/2020 |
| JP | 2020197523 A | 12/2020 |
| WO | WO-2014020471 A2 * | 2/2014 .......... G01T 1/1647 |

OTHER PUBLICATIONS

Japanese First Office Action (JP Application No. 2023-547840), dated May 14, 2024, 4 pages.
International Search Report of PCT/CN2022/075457.
Zhou Wang et al., "Dynamic evolution of 100-keV H+ through polycarbonate nanocapillaries", Acta Physica Sinica, vol. 65, No. 10, Dec. 31, 2016.

* cited by examiner

FIG. 7

PET-DATA CORRECTION METHOD AND DEVICE, COMPUTER APPARATUS, AND PET-IMAGE RECONSTRUCTION METHOD

CROSS-REFERENCE TO RELATED APPLICATION

The present application is a U.S. National Stage of International Application No. PCT/CN2022/075457, filed on Feb. 8, 2022, which claims the priority of the Chinese patent application No. 202110171084.5, filed with China National Intellectual Property Administration on Feb. 8, 2021 and entitled "PET-DATA CORRECTION METHOD AND DEVICE, COMPUTER APPARATUS, AND PET-IMAGE RECONSTRUCTION METHOD", which is incorporated herein by reference in its entirety.

TECHNICAL FIELD

The application relates to the technical field of medical imaging, in particular to a PET-data correction method, a PET-data correction device, a computer apparatus, and a PET-image reconstruction method.

BACKGROUND

Positron Emission Tomography (PET) is performed by detecting a pair of γ photons generated by positron annihilation. The PET system generally includes multiple detector modules, and each pair of γ photons generated by the positron annihilation will hit two different detector modules, and the detector modules detect them. After hitting the scintillation crystal in the detector modules, the γ photons are absorbed, and then fluorescence generates, and the fluorescence reaches the photoelectric sensor, and an electrical signal is generated. The γ photons generated by the positron annihilation each have an energy of 511 keV. The scintillation crystal absorbs the γ photons in many manners. The first case is that the γ photon is completely absorbed at the first point, and all energy thereof is deposited. The second case is that the γ photon scatters at the first point, and that part of the energy thereof is deposited, and that the remaining energy is absorbed at the second point. The third case is that the γ photon scatters multiple times, and the energy thereof is deposited at multiple points. The properties generated in these three cases of the deposition of the γ photons are different. In traditional image reconstruction solutions, the cases of the depositions of the γ photon are not distinguished, and all γ photon events are not distinguished either, and an image reconstruction is performed by using the same parameter, thus the quality of image is affected by the scattering events and the number of times the scattering occurs, resulting in an inaccurate reconstructed result and a poor imaging effect.

At present, for the problem that the reconstructed result is inaccurate and the imaging effect is poor in the traditional image reconstruction solutions in the related art, no effective solutions have been proposed yet.

SUMMARY

The embodiments of the present application provide a PET-data correction method, a PET-data correction device, a computer apparatus and a PET-image reconstruction method, so as to at least solve the problem that the reconstructed result is inaccurate and the imaging effect is poor in the traditional image reconstruction solutions in the related art.

In a first aspect, the embodiment of the present application provides a PET-data correction method, including:
  acquiring single-events during a PET scan, the single-events including a non-scattering event and a scattering event;
  obtaining a first correction parameter of the non-scattering event, and correcting the non-scattering event according to the first correction parameter;
  obtaining scattering features of the scattering event, and classifying the scattering event based on the scattering features;
  obtaining a second correction parameter of the scattering event of each different classification; and
  correcting the scattering event according to the second correction parameter.

In some embodiments, the scattering features include at least one of the number of times scattering occurs, a scattering spatial range, a maximum point-deposited-energy, and a time distribution of scattering points.

In some embodiments, the scattering features include the number of times scattering occurs, and the classifying the scattering event based on the scattering features includes:
  classifying the scattering event as a one-scattering event, a two-scattering event, or a multiple-scattering event based on the number of times scattering occurs.

In some embodiments, the scattering features include the scattering spatial range, and the classifying the scattering event based on the scattering features includes:
  classifying the scattering event as a short-distance scattering event or a long-distance scattering event based on the scattering spatial range.

In some embodiments, the scattering features include the maximum point-deposited-energy, and the classifying the scattering event based on the scattering features includes:
  classifying the scattering event as a high-energy scattering event or a low-energy scattering event based on the maximum point-deposited-energy.

In some embodiments, the scattering features include the time distribution of scattering points, and the classifying the scattering event based on the scattering features:
  classifying the scattering event as a long-interval scattering event or a short-interval scattering event based on the time distribution of scattering points.

In some embodiments, after the obtaining scattering features of the scattering event, the method further includes:
  performing a scattering restoration for the scattering event.

In a second aspect, the embodiment of the present application provides a PET-image reconstruction method, including:
  obtaining the scattering event and the non-scattering event, which are corrected by using the PET-data correction method above;
  obtaining a coincidence event based on the corrected scattering event and the corrected non-scattering event;
  reconstructing the coincidence event according to the scattering features to obtain the PET image.

In some embodiments, during the reconstructing the coincidence event according to the scattering features, a reconstruction parameter of the scattering event is different from a reconstruction parameter of the non-scattering event, and a reconstruction parameter of the scattering event of each different classification is different.

In a third aspect, the embodiment of the present application provides a PET-data correction device, including:

an event acquiring module, configured to acquire single-events during a PET scan, wherein the single-events includes a non-scattering event and a scattering event;

a first correcting module, configured to obtain a first correction parameter of the non-scattering event, and correct the non-scattering event according to the first correction parameter;

a classifying module, configured to obtain scattering features of the scattering event, and classify the scattering event based on the scattering features;

a parameter obtaining module, configured to obtain a second correction parameter of the scattering events of each different classification; and a second correcting module, configured to correct the scattering event according to the second correction parameter.

In a fourth aspect, the embodiment of the present application provides a computer apparatus. The computer apparatus includes a memory, a processor, and a computer program stored in the memory and executable by the processor. The processor, when executing the computer program, performs the PET-data correction method provided in the first aspect, and the PET-image reconstruction method provided in the second aspect.

Compared with the related art, the PET-data correction method, the PET-data correction device, the computer apparatus and the PET-image reconstruction method provided by the embodiments of the present application acquire the single-events during the PET scan, and the single-events include the non-scattering event and the scattering event. The first correction parameter of the non-scattering event is obtained, and the non-scattering event is corrected according to the first correction parameter. The scattering features of the scattering event are obtained, and the scattering event is classified based on the scattering features. The second correction parameters of the scattering events of different classifications are obtained. The scattering event is corrected according to the second correction parameter. The scattering event and the non-scattering event are distinguished and corrected separately, and are classified according to the features of the scattering events, and the scattering events of different classifications are corrected by using corresponding correction parameters, and the image reconstruction is performed based on the corrected scattering event and non-scattering event, thus the reconstructed result is more accurate and the imaging effect is better.

The details of one or more embodiments of the present application are provided in the accompanying drawings and the description hereinafter, so that other features, objectives, and advantages of the present application are more comprehensible.

BRIEF DESCRIPTION OF THE DRAWINGS

The accompanying drawings that constitute part of the present application are provided to make the present application to be further understood. The illustrative embodiments of the present application as well as the description thereof are provided to explain the present application, but not intended to constitute improper limitations to the present application. In the drawings.

DETAILED DESCRIPTION OF THE EMBODIMENTS

In order to make the objectives, technical solutions, and advantages of the present application clearer and better understood, the present application is described and illustrated below combining with the accompanying drawings and embodiments. It should be understood that specific embodiments described herein are only intended to explain the application but not intended to limit the application. All other embodiments obtained by those of ordinary skill in the art based on the embodiments of the application without involving creative efforts fall within the protection scope of the application.

Obviously, the accompanying drawings in the following description are merely some examples or embodiments of the application. For those of ordinary skill in the art, the present application may also be applied to other similar scenarios based on these accompanying drawings without involving creative efforts. In addition, it should be understood that although the efforts made in a development process may be complicated and lengthy, for those of ordinary skill in the art related to the disclosure of the present application, some designs, manufacturing, or production changes made on the basis of the technology disclosed in the present application, are only conventional technical means, and should not be understood as contents insufficiently disclosed in the present application.

The term "embodiment" mentioned in the present application means that specific features, structures or characteristics, which are described combining with the embodiments, may be included in at least one embodiment of the application. This term described at various places in the description does not necessarily refer to the same embodiment, nor is it an independent or an alternative embodiment mutually exclusive with other embodiments. It is understood explicitly and implicitly by those of ordinary skill in the art that, if no confliction occurs, the embodiments described in the application may be combined with other embodiments.

Unless otherwise defined, the technical terms or scientific terms involved in the application shall have general meanings as understood by those of ordinary skill in the related art. The terms "a", "an", "one", "the", and the like in the application do not imply a limitation to the quantity, and may denote the singular or plural ones. The terms "comprise", "include", "have", and any variation thereof in the application are intended to cover non-exclusive inclusion. For example, a process, a method, a system, a product, or a device, which includes a series of steps or components (units), is not limited to the listed steps or units, but may also include steps or units that are not listed, or may also include other steps or units inherent to the process, the method, the product or the device. The terms "connect", "communicate", "couple", and the like in the application, are not limited to a physical or mechanical connection, but may include an electrical connection, whether it is direct or indirect. The "plurality" referred to in the application refers to a number of two or more. "And/or" describes an association relationship of associated objects, and means that there may be three kinds of relationships. For example, "A and/or B" may indicate that there are three situations: A alone, A and B together, and B alone. The character "/" generally indicates that the associated objects are in an "or" relationship. The terms "first", "second", "third", and the like in the application are merely used to distinguish similar objects, but do not represent a specific ordering of the objects.

Figure 1:
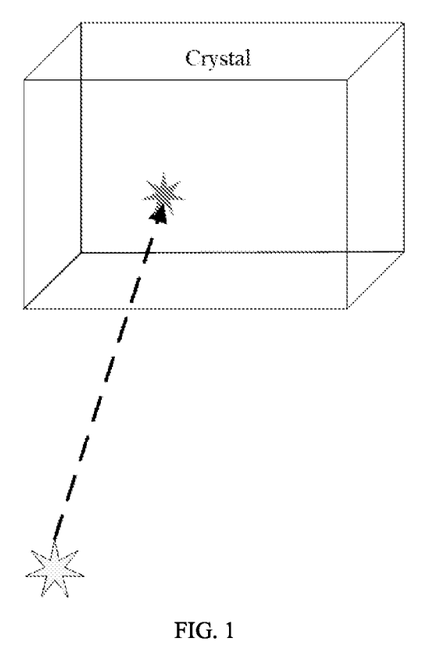
FIG. 1 is a schematic view illustrating a γ photon of the present application, all energy of which is deposited at one point when the γ photon hits a scintillation crystal.
Figure 2:
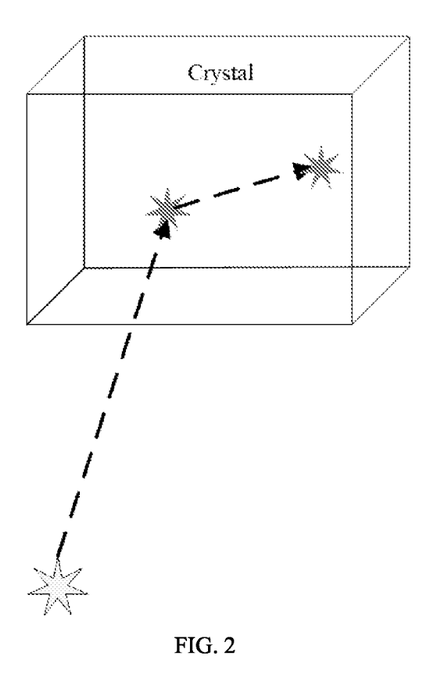
FIG. 2 is a schematic view illustrating a γ photon of the present application, energy of which is deposited at multiple points when the γ photon hits the scintillation crystal.

In the positron emission tomography (PET), when a positron decays, a pair of γ photons are generated and move in opposite directions. When the γ photon hits a scintillation crystal, there is a certain probability that all energy of the γ photon is deposited, which is shown in FIG. 1, and there is also a certain probability that part of the energy thereof is deposited, and that the remaining energy is taken away by the γ photon and deposited at another point or at multiple points, which is shown in FIG. 2. In a traditional solution, these two cases are not distinguished and regarded as the same event to be corrected and reconstructed, thus affecting the reconstruction result, and resulting in the inaccurate reconstructed result and the poor imaging effect.

Figure 3:
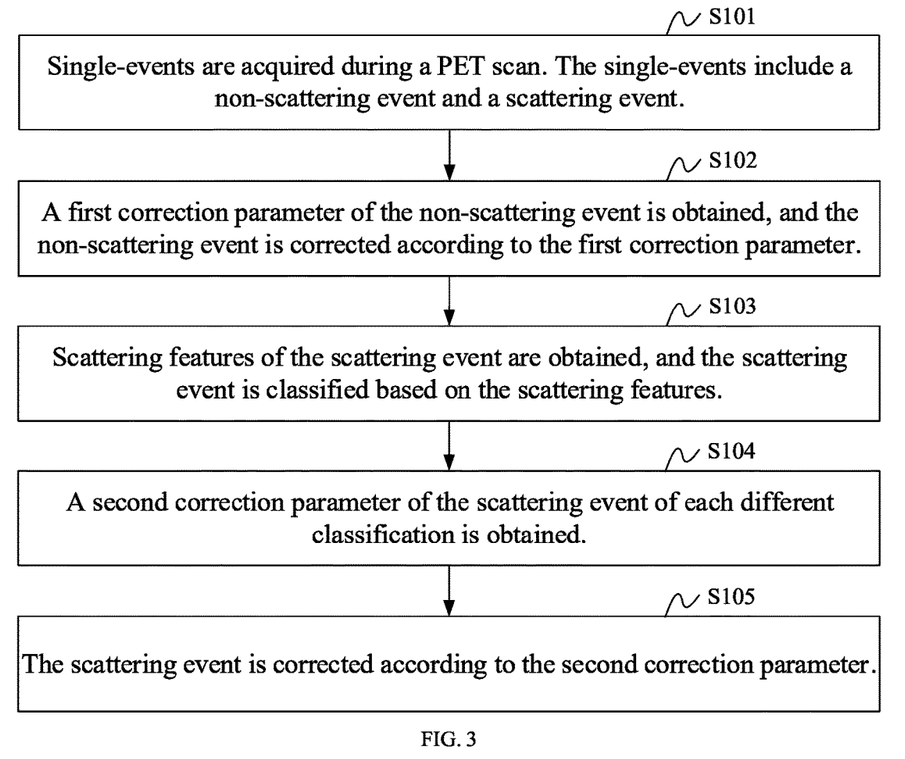
FIG. 3 is a schematic flow chart of a PET-data correction method according to an embodiment of the present application.

Referring to FIG. 3, FIG. 3 is a schematic flow chart of a PET-data correction method according to an embodiment of the present application.

In this embodiment, the PET-data correction method includes steps S101 to S105.

At step S101, single-events are acquired during a PET scan. The single-events include a non-scattering event and a scattering event.

Exemplarily, during the PET scan, a radionuclide decays in a human body and releases a positron. The positron in motion hits an electron and annihilates. After the annihilation, two photons are generated and move in opposite directions, then are received by the detector. Single-event data are obtained according to data received by the detector. An event that the detector receives a photon is defined as the single-event. Specifically, an event that the photon is completely absorbed at the first point and that all energy thereof is deposited is defined as the non-scattering event, and an event that the photon scatters and that the energy thereof is deposited at two or more points is defined as the scattering event.

At step S102, a first correction parameter of the non-scattering event is obtained, and the non-scattering event is corrected according to the first correction parameter.

Exemplarily, the first correction parameter of the non-scattering event belongs to the correction parameter of a conventional annihilation event, and this correction parameter and a correction process are not specifically limited. The specific correction parameter and correction process can be implemented by referring to the prior art. In the prior art, correcting non-scattered events based on the first correction parameters typically involves energy correction. Exemplarily, the first correction parameter is an energy calibration parameter, and specifically, the first correction parameter is an energy scale curve parameter. Document CN111714147A (Pub. Data: Sep. 29, 2020) discloses a method for obtaining an energy scale curve, and a method for energy correction of PET detector crystals, in which, according to the obtained energy scale curve, the ADC value corresponding to the 511 keV energy peak in the energy scale curve is identified, and based on the ADC value corresponding to the 511 keV energy peak, the energy received by the detector crystals is corrected, thereby enabling the detector to correct the energy of each non-scattered event.

At step S103, scattering features of the scattering event are obtained, and the scattering event is classified based on the scattering features.

Exemplarily, the γ photon has different scattering features according to different scattering conditions such as energy deposition, the number of times scattering occurs, etc., during the scattering, and the scattering event may be classified based on the scattering features. It may be understood that corresponding tag information may be added to each of the scattering events of different classifications according to the classification result.

Specifically, data packets collected during the PET scan may be statistically analyzed to obtain the features such as the deposited energy and the number of times the scattering occurs, and according to the statistic of the features and the resource of the data, each data packet is tagged by the corresponding tag information based on the features.

At step S104, a second correction parameter of the scattering event of each different classification is obtained.

It should be understood that since the features, such as the energy resolution and time resolution of the scattering event are different from those of the non-scattering event, if the same parameter are used to correct the scattering event and the non-scattering event to reconstruct an image, it will cause a low accuracy of the image reconstruction, and the effect may be poor. Therefore, the scattering events are classified according to the scattering features, and the second correction parameters of the scattering events of different classifications are obtained based on the classification result, and are used for subsequent corrections and image reconstructions of the scattering events of different classifications respectively.

Specifically, taking grid parameters as an example, the categorized data are separated to form a flood map separately, and grids are drawn according to the distribution of the flood map. Grid parameters of different classifications are stored in the memory of the detector, and the events outputted by the detector are classified according to the number of times scattering occurs, namely one, two, three or more. The classification is used as a portion of an address, and different grid parameters stored in the memory are searched to get a crystal number, so as to complete the grid correction.

Taking a time correction as an example, coincidence data are collected, and are classified according to the number of times scattering occurs. Time offset parameters of the coincidence data are calculated respectively and are stored in the memory of the detector, and the events outputted by the detector are classified according to the number of times scattering occurs, namely one, two, three or more. The classification is used as a portion of the address, and a time offset parameter is searched and added to a detected arrival time parameter of the γ photon, so as to complete the time offset correction.

Similarly, as for the energy-correction parameter, single-event data are collected to get crystal energy spectrums of different numbers of times scattering occurs, and the energy-correction parameter is calculated and stored in the memory of the detector. The events outputted by the detector are classified according to the number of times scattering occurs, namely one, two, three or more. The classification is used as a portion of the address to search the energy-correction parameter, and the energy of the event is calculated according to a specified formula.

At step S105, the scattering event is corrected according to the second correction parameter.

Exemplarily, the second correction parameter is determined according to the classification of the scattering event, so targeted corrections may be performed on the scattering events of different classifications respectively, thus the reconstructed result is more accurate, and the imaging effect is better.

In another embodiment, the scattering feature includes at least one of the number of times scattering occurs, a scattering spatial range, a maximum point-deposited-energy, and a time distribution of scattering points.

It should be understood that the scattering event may be classified according to only one feature among the number of times scattering occurs, the scattering spatial range, the maximum point-deposited-energy and the time distribution of scattering points, or that the scattering event may also be classified according to two or more features among the number of times scattering occurs, the scattering spatial range, the maximum point-deposited-energy, and the time distribution of scattering points. The manner, in which the scattering event is classified, is not limited hereinafter and may be determined by a user according to actual needs.

In other embodiments, scattering features in other dimensions, which are not specifically limited herein, may be extracted.

Exemplarily, the second correction parameter is related to the scattering feature. For example, when the classification is performed based on a classification standard of the scattering spatial range, it is a deviation in location dimension of the scattering event that is corrected according to the obtained second correction parameter; when the classification is performed based on a classification standard of the maximum point-deposited-energy, it is a deviation in energy dimension of the scattering event that is corrected according to the obtained second correction parameter; and when the classification is performed based on a classification standard of the time distribution of scattering points, it is a deviation in time dimension of the scattering event that is corrected according to the obtained second correction parameter.

In another embodiment, the second correction parameter corresponding to each scattering feature is calculated in advance and stored in the database. When the scattering feature of the scattering event is obtained, a search is performed in the database according to the scattering feature to obtain the corresponding second correction parameter to correct the scattering event. Specifically, how to obtain the second correction parameters according to different scattering features is not specifically limited herein, as long as a deviation corresponding to the scattering feature may be corrected.

In another embodiment, the scattering features include the number of times scattering occurs, and classifying the scattering event based on the scattering features includes a following step of:

classifying the scattering event as a one-scattering event, a two-scattering event, or a multiple-scattering event based on the number of times scattering occurs.

In this embodiment, if the scattering event is that scattering occurs only once, that is, the γ photon scatters at the first point and part of the energy thereof is deposited, and the remaining energy is absorbed at the second point, then the scattering event is classified as the one-scattering event. If the scattering event is that scattering occurs twice, that is, firstly the γ photon scatters at the first point and part of the energy thereof is deposited, and secondly the γ photon scatters at the second point, and part of the energy is deposited, lastly the remaining energy is absorbed at the third point, then the scattering event is classified as a two-scattering event. If the scattering event is that scattering occurs multiple times, that is, the γ photon scatterers multiple times, and energy is deposited at multiple points, then the scattering event is classified as a multiple-scattering event, where the scattering occurring multiple times includes the scattering occurring more than three times.

In another embodiment, the scattering features include the scattering spatial range, and classifying the scattering event based on the scattering features includes a following step of:

classifying the scattering event as a short-distance scattering event or a long-distance scattering event based on the scattering spatial range.

Exemplarily, if the scattering spatial range of the scattering event is within a preset scattering range, the scattering event is classified as the short-distance scattering event, and if the scattering spatial range of the scattering event is not within the preset scattering range, the scattering event is classified as the long-distance scattering event. Where, the preset scattering range may be set by a user according to an actual situation, and is not specifically limited herein. The short-distance scattering event and the long-distance scattering event have different effects on a determination of the position of the annihilation point. The scattering event is distinguished and corrected according to the scattering spatial range, which may reduce the deviation in location dimension.

In another embodiment, the scattering features include the maximum point-deposited-energy, and classifying the scattering event based on the scattering features includes a following step of:

classifying the scattering event as a high-energy scattering event or a low-energy scattering event based on the maximum point-deposited-energy.

Exemplarily, the maximum point-deposited-energy is the energy of the scattering point with the maximum deposited energy during the γ photon scattering. If the maximum point-deposited-energy of the scattering event is greater than a preset deposited energy, the scattering event is classified as the high-energy scattering event, and if the maximum point-deposited-energy of the scattering event is less than or equal to the preset deposited energy, the scattering event is classified as the low-energy scattering event. It may be understood that the preset deposited energy may be set by the user according to an actual need, and is not specifically limited herein. The high-energy scattering event and the low-energy scattering event have different effects on the determination of the position of the annihilation point. The scattering event is distinguished and corrected by the maximum point-deposited-energy, which may reduce the deviation in energy dimension. In another embodiment, the scattering features include the time distribution of scattering points, and classifying the scattering event based on the scattering features includes a following step of:

classifying the scattering event as a long-interval scattering event or a short-interval scattering event based on the time distribution of scattering points.

Exemplarily, there is a time interval between time points when energy depositions of the γ photon occur at two adjacent scattering points. If the minimum time interval between two adjacent scattering points of the scattering event is greater than a preset time interval, the scattering event is classified as a long-interval scattering event, and if the minimum time interval between two adjacent scattering points of the scattering event is less than or equal to the preset time interval, the scattering event is classified as a short-interval scattering event. It should be understood that the preset time interval may be set by the user according to an actual situation, and is not specifically limited herein. The long-interval scattering event and the short-interval scattering event have different effects on the determination of the position of the annihilation point. The scattering events are distinguished and corrected according to the time distributions of scattering points, which may reduce the deviation in time dimension.

In another embodiment, the scattering event is classified according to two or more features among the number of times scattering occurs, the scattering spatial range, the maximum point-deposited-energy, and the time distribution of scattering points. For example, the scattering event is classified as the one-scattering event, the two-scattering event, or the multiple-scattering event based on the number of times scattering occurs, and the scattering event is classified as the short-distance scattering event or the long-distance scattering event based on the scattering spatial range, the second correction parameter of the scattering event is obtained based on the number of times scattering occurs and the scattering spatial range.

Exemplarily, the scattering event may be corrected only by the second correction parameter obtained based on a single scattering feature, or the scattering event may be corrected by using two or more second correction parameters at the same time.

Correcting the scattering event is modifying attribute information such as a position, an energy, and a time of the particle, so as to make them more accurate. Two second correction parameters may be used to correct the same attribute at the same time. For example, one time-offset correction value may be obtained by searching a table based on the scattering distance, and another time-offset correction value may be obtained based on the number of times scattering occurs, and the two time-offset correction values are added together to correct the time. If different attributes are to be corrected, the corrections are performed separately for the different attributes. For example, for the position of the particle, a position-offset correction value is obtained by searching a table based on the scattering distance; and for the energy of the particle, an energy-offset correction value is obtained by searching a table based on the maximum point-deposited-energy. These two correction values are used to correct the position and the energy of the particle, respectively.

In another embodiment, after the obtaining the scattering features of the scattering event, the following step is further included:

performing a scattering restoration for the scattering event.

Exemplarily, the scattering event is a single-event that does not meet an energy threshold, and before correcting the scattering event and performing an image reconstruction based on the corrected scattering event, the scattering event is necessarily restored to the single-event that meets the energy threshold. Specifically, the energy threshold is obtained based on pre-experiments, and is an optimal value for theoretically determining a single-event to be a scattering event or not.

Figure 4:
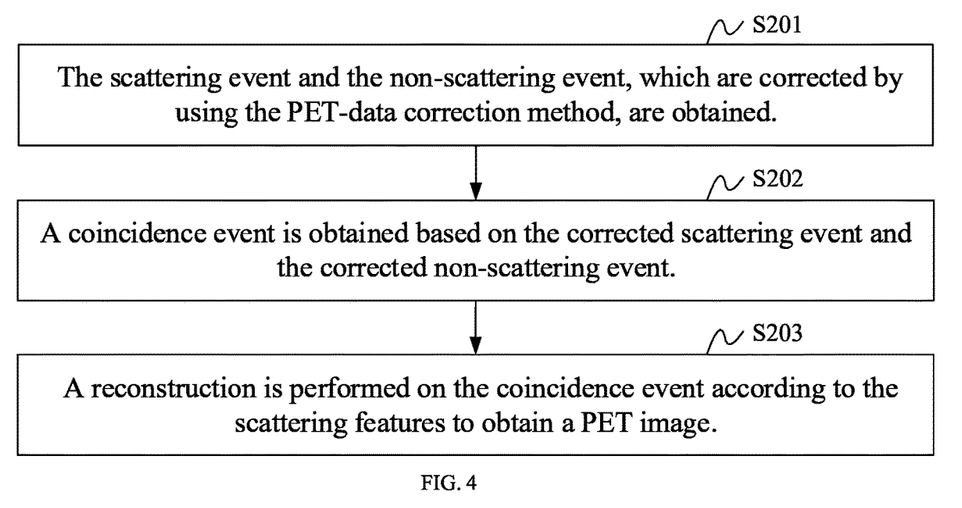
FIG. 4 is a schematic flow chart of a PET-image reconstruction method according to an embodiment of the present application.

Referring to FIG. 4, FIG. 4 is a schematic flow chart of the PET-image reconstruction method according to an embodiment of the present application.

In this embodiment, the PET-image reconstruction method includes following steps S201 to S203.

At step S201, the scattering event and the non-scattering event, which are corrected by using the PET-data correction method, are obtained.

Exemplarily, the single-events during the PET scan include the non-scattering event and the scattering event. The non-scattering event may be directly used for an image reconstruction, or may also be used for the image reconstruction after it is corrected. The scattering event needs to be corrected by using the PET-data correction method above before it is used for the image reconstruction.

At step S202, a coincidence event is obtained based on the corrected scattering event and the corrected non-scattering event.

It may be understood that the corrected scattering events and non-scattering events constitute all single-events obtained during the PET scan, and a coincidence of the single-events is performed to obtain the coincidence event.

Specifically, during the PET scan, the radionuclide decays in the human body and releases positrons. The positron in motion collides with an electron and annihilates. After the annihilation, a pair of photons are generated and move in opposite directions, and are received by the detector. The data of the pair of photons received by the detector are called coincidence-event data. The detector is composed of many crystals, and data of a photon received by each crystal is called single-event data. It may be understood that when a coincidence is performed for the single-events corresponding to the matched photons received by two crystals, the coincidence event corresponding to the pair of photons is obtained.

At step S203, an image reconstruction is performed on the coincidence event according to the scattering features to obtain a PET image.

Exemplarily, part of the coincidence events includes scattering events, and reconstruction parameters are selected for the image reconstruction according to the scattering features of corresponding scattering events, so that the reconstructed result is more accurate and the imaging effect is better.

In the PET-data correction method and the PET-image reconstruction method above, the single-events are acquired during the PET scan, and the single-events include the non-scattering event and the scattering event. The first correction parameter of the non-scattering event is obtained, and the non-scattering event is corrected according to the first correction parameter. The scattering features of the scattering event are obtained, and the scattering event is classified based on the scattering features. The second correction parameters of the scattering events of different classifications are obtained. The scattering event is corrected according to the second correction parameter. The scattering event and the non-scattering event are distinguished and corrected separately, and are classified according to the features of the scattering events, and the scattering events of different classifications are corrected by using corresponding correction parameters, and the image reconstruction is performed based on the corrected scattering event and non-scattering event, thus the reconstructed result is more accurate and the imaging effect is better.

In some embodiments, in the process of reconstructing the coincidence event according to the scattering features, the reconstruction parameter of the scattering event is different from the reconstruction parameter of the non-scattering event, and the reconstruction parameter of the scattering event of each different classification is different.

Specifically, taking a time-of-flight (TOF) reconstruction as an example, a TOF performance of the event will be used in the reconstruction. A position distribution may be generated in the reconstruction of the event. If the TOF performance is better, a possible distribution range is smaller. The TOF performance of the scattering event is significantly different from the TOF performance of the non-scattering event. The scattering event and the non-scattering event are reconstructed by using their respective TOF performance parameters. The scattering events of different classifications are reconstructed by using different TOF performance parameters, then the reconstructed results are superposed, thereby improving the performances of the image.

It should be noted that the steps shown in the process above or in the flow chart of the accompanying drawings may be executed, for example, in a computer system including a set of computer-executable instructions. Although a logical order is shown in the flow chart, in some cases, the shown or described steps may be performed in an order different from one described herein.

The embodiments also provide a PET-image reconstruction device and a PET-data correction device, and the devices are used to implement the foregoing embodiments and optional implementation manners. What have been described will not be repeated. As used herein, the terms "module", "unit", "subunit", and the like, may be a combination of a software and/or a hardware that may realize a predetermined function. Although the devices described in the following embodiments are preferably implemented by a software, an implementation by hardware or by a combination of software and hardware is also possible and conceivable.

Figure 5:
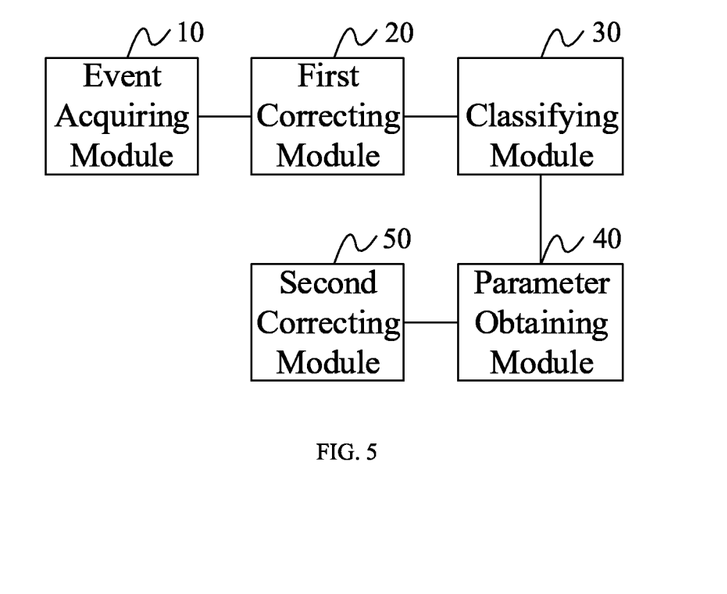
FIG. 5 is a block diagram illustrating a structure of a PET-data correction device according to an embodiment of the present application.

FIG. 5 is a block diagram illustrating a structure of a PET-data correction device according to an embodiment of the present application. As shown in FIG. 5, the device includes: an event acquiring module 10, a first correcting module 20, a classifying module 30, a parameter obtaining module 40, and a second correcting module 50.

The event acquiring module 10 is configured to acquire single-events during a PET scan. The single-events include a non-scattering event and a scattering event.

The first correcting module 20 is configured to obtain a first correction parameter of the non-scattering event, and correct the non-scattering event according to the first correction parameter.

The classifying module 30 is configured to obtain the scattering features of the scattering event, and classify the scattering event based on the scattering features.

The classifying module 30 is further configured to classify the scattering event as a one-scattering event or a multiple-scattering event based on the number of times scattering occurs.

The classifying module 30 is further configured to classify the scattering event as a short-distance scattering event or a long-distance scattering event based on the scattering spatial range.

The classifying module 30 is further configured to classify the scattering event as a high-energy scattering event or a low-energy scattering event based on the maximum point-deposited-energy.

The classifying module 30 is also configured to classify the scattering event as a long-interval scattering event or a short-interval scattering event based on the time distribution of scattering points.

The parameter obtaining module 40 is configured to obtain a second correction parameter of the scattering events of each different classification.

The second correcting module 50 is configured to correct the scattering event according to the second correction parameter.

The PET-data correction device further includes a scattering restoring module.

The scattering restoring module is configured to perform a scattering restoration for the scattering event.

Figure 6:
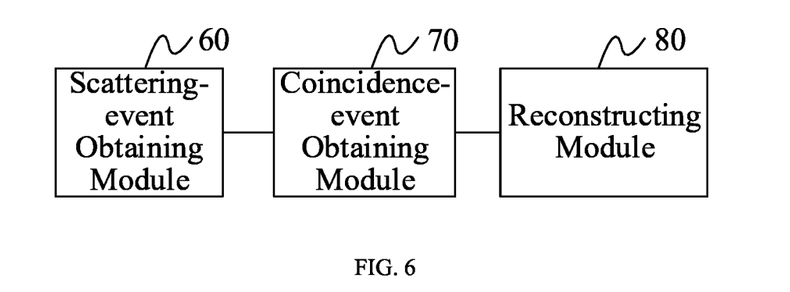
FIG. 6 is a block diagram illustrating a structure of a PET-image reconstruction device according to an embodiment of the present application.

FIG. 6 is a block diagram illustrating a structure of a PET-image reconstruction device according to an embodiment of the present application. As shown in FIG. 6, the device includes: a scattering-event obtaining module 60, a coincidence-event obtaining module 70, and a reconstructing module 80.

The scattering-event obtaining module 60 is configured to obtain the scattering event and the non-scattering event, which are corrected by using the PET-data correction method.

The coincidence-event obtaining module 70 is configured to obtain a coincidence event based on the corrected scattering event and non-scattering event.

The reconstructing module 80 is configured to perform an image reconstruction for the coincidence event according to the scattering features to obtain a PET image.

In some embodiments, when the image reconstruction is performed by the reconstructing module 80, the reconstruction parameter of the scattering event is different from the reconstruction parameter of the non-scattering event, and the reconstruction parameters of the scattering events of different classifications are different.

It should be noted that each of the modules may be a function module or a program module, and may be realized by software or by hardware. For the modules implemented by hardware, all of the modules above may be located in the same processor, or the modules above may be located in different processors in the form of any combination.

Figure 7:
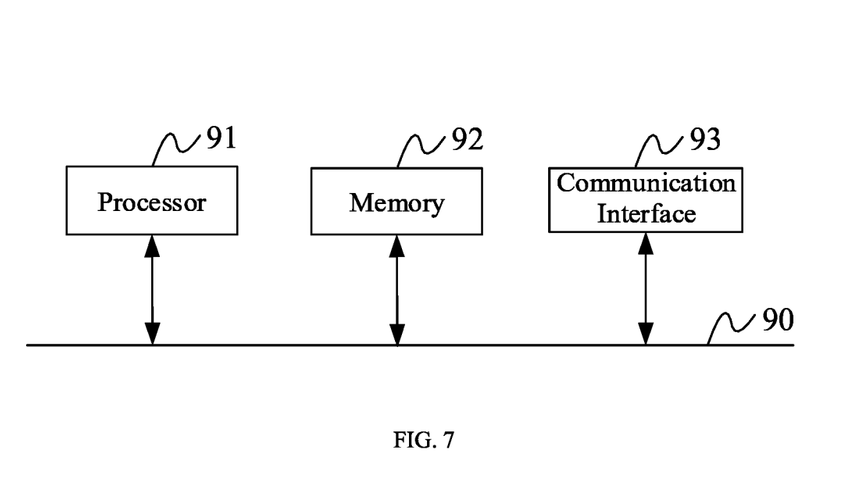
FIG. 7 is a schematic view illustrating a hardware structure of a computer apparatus according to an embodiment of the present application.

In addition, the PET-data correction method of the embodiment of the present application described in FIG. 3 and the PET-image reconstruction method may be implemented by a computer apparatus. FIG. 7 is a schematic view illustrating a hardware structure of a computer apparatus according to an embodiment of the present application.

The computer apparatus may include a processor 91, and a memory 92 storing computer program instructions.

Specifically, the processor 91 may include a central processing unit (CPU), or an application specific integrated circuit (ASIC for short), or may be configured to be one or more integrated circuits which implement the embodiments of the present application.

The memory 92 may include a mass memory for data or instructions. The memory 92 may include, for example but is not limited to, a hard disk drive (HDD for short), a floppy disk drive, a solid state drive (SSD for short), a flash memory, an optical disk, a magneto-optical disk, a magnetic tape, or a universal serial bus (USB for short) driver, or a combination of two or more of what listed above. In a proper situation, the storage 92 may include removable or non-removable (or fixed) media. In a proper situation, the memory 92 may be arranged inside or outside the data processing device. In a particular embodiment, the memory 92 is a non-volatile memory. In a specific embodiment, the memory 92 includes a read-only memory (ROM for short) and a random-access memory (RAM for short). In a proper situation, the ROM may be a mask-programmed ROM, a programmable read-only memory (PROM for short), an erasable programmable read-only memory (EPROM for short), an electrically erasable programmable read-only memory (EEPROM for short), an electrically alterable read-only memory (EAROM for short), or a flash memory, or a combination of two or more of what listed above. In a proper situation, the RAM may be a static random-access memory (SRAM for short), or a dynamic random-access memory (DRAM for short). The DRAM may be a fast page mode dynamic random-access memory (FPMDRAM for short), an extended data out dynamic random-access memory (EDODRAM for short), a synchronous dynamic random-access memory (SDRAM for short), etc.

The memory 92 is configured to store or cache various data files that need to be processed and/or communicated, as well as computer program instructions executed by the processor 91 possibly.

The processor 91 may implement any one of the PET-data correction methods and the PET-image reconstruction method in the embodiments above by reading and executing the computer program instructions stored in the memory 92.

In some of these embodiments, the computer apparatus may further include a communication interface 93 and a bus 90. As shown in FIG. 7, the processor 91, the memory 92, and the communication interface 93 are connected through the bus 90 to complete mutual communication.

The communication interface 93 is configured to realize the communication between various modules, devices, units and/or devices in the embodiments of the present application. The communication interface 93 may also implement data communication with other components such as external devices, image/data acquisition equipment, databases, external storage, and image/data processing workstations.

The bus 90 includes a hardware, a software, or both the hardware and the software, and the components of the computer apparatus are coupled to each other. The bus 90 includes but is not limited to at least one of the following: a data bus, an address bus, a control bus, an expansion bus, and a local bus. The bus 90 may include, for example but is not limited to, an accelerated graphics port (AGP for short) or other graphics bus, an enhanced industry standard architecture (EISA for short) bus, a front side bus (FSB for short), a hyper transport (HT for short) interconnection, an industry standard architecture (ISA for short) bus, an infinite bandwidth (InfiniBand for short) interconnection, a low pin count (LPC for short) bus, a memory bus, a micro channel architecture (MCA for short) bus, a peripheral component interconnect (PCI) bus, a PCI-Express (PCI-X) bus, a serial advanced technology attachment (SATA for short) bus, a video electronics standards association local bus (VLB for short), or other suitable bus, or a combination of two or more of these buses. In a proper situation, the bus 90 may include one or more buses. Although particular buses are described and illustrated in the embodiments of this application, any suitable bus or interconnect may be contemplated in this application.

The computer apparatus may execute the PET-data correction method and the PET-image reconstruction method in the embodiments of the present application based on the acquired computer program instructions, thereby realizing the PET-data correction method described in combination with FIG. 3 and the PET-image reconstruction method.

In addition, reconstruction method in the foregoing embodiments, the embodiments of the present application may provide a computer-readable storage medium to implement the PET-data correction method and the PET-image reconstruction method in the embodiments of the present application. Computer program instructions are stored on the computer-readable storage medium; when executed by a processor, the computer program instructions perform any one of the PET-data correction methods and the PET-image reconstruction methods in the embodiments above.

In the PET-data correction method, the PET-data correction device, the computer apparatus and the PET-image reconstruction method above, the single-events are acquired during the PET scan, and the single-events include the non-scattering event and the scattering event. The first correction parameter of the non-scattering event is obtained, and the non-scattering event is corrected according to the first correction parameter. The scattering features of the scattering event are obtained, and the scattering event is classified based on the scattering features. The second correction parameters of the scattering events of different classifications are obtained. The scattering event is corrected according to the second correction parameter. The scattering events are classified according to the features of the scattering events, and the scattering events of different classifications are corrected by using corresponding correction parameters, and the image reconstruction is performed based on the corrected scattering event and non-scattering event, thus the reconstructed result is more accurate and the imaging effect is better.

The technical features of the embodiments above may be combined arbitrarily. To make the description concise, not all possible combinations of the technical features in the above embodiments are described. However, as long as there are no contradictions in the combinations of these technical features, all of the combinations should be considered to be within the scope of the specification.

The embodiments above only represent several implementation modes of the present application, and the description thereof is relatively specific and detailed, but it should not be construed as limiting the scope of the patent. It should be noted that for those skilled in the art, various modifications and improvements may be made without departing from the concept of the present application, and all these modifications and improvements belong to the protection scope of the present application. Therefore, the scope of protection of the patent application should be subject to the appended claims.

What is claimed is:

1. A PET-data correction method, applied to a PET-data correction device, wherein the PET-data correction device comprises a detector and a processor, the detector is connected to the processor, and the PET-data correction method comprises:

a detector receiving photons generated by positron annihilation and sending photon data to the processor; the processor acquiring single-event data according to received photon data, and dividing single-events into a non-scattering event and a scattering event according to points where energy of the single-events deposited;

the processor obtaining a first correction parameter of the non-scattering event, and correcting the non-scattering event according to the first correction parameter;

the processor obtaining scattering features of the scattering event, and classifying the scattering event based on the scattering features, the scattering features comprising at least one of a maximum point-deposited-energy or a time distribution of scattering points;

the processor obtaining a second correction parameter of the scattering event of each different classification, and outputting the second correction parameter to a memory of the detector to store the second correction parameter; and the processor correcting the scattering event according to the second correction parameter stored in the memory of the detector.

2. The PET-data correction method according to claim 1, wherein the scattering features further comprise at least one of the number of times scattering occurs or a scattering spatial range.

3. The PET-data correction method according to claim 1, wherein the scattering features further comprise the number of times scattering occurs, and the processor classifying the scattering event based on the scattering features comprises:
the processor classifying the scattering event as a one-scattering event, a two-scattering event, or a multiple-scattering event based on the number of times scattering occurs.

4. The PET-data correction method according to claim 3, wherein the processor classifying the scattering event as the one-scattering event, the two-scattering event, or the multiple-scattering event based on the number of times scattering occurs, comprises:
if the scattering event is that scattering occurs only once, that is, an γ photon scatters at a first point and part of energy thereof is deposited, and remaining energy is absorbed at a second point, then the scattering event is classified as the one-scattering event;
if the scattering event is that scattering occurs twice, that is, firstly the γ photon scatters at the first point and part of the energy thereof is deposited, and secondly the γ photon scatters at the second point, and part of the energy is deposited, lastly the remaining energy is absorbed at a third point, then the scattering event is classified as a two-scattering event; and
if the scattering event is that scattering occurs multiple times, that is, the γ photon scatterers multiple times, and energy thereof is deposited at multiple points, then the scattering event is classified as a multiple-scattering event, wherein the scattering occurring multiple times comprises the scattering occurring more than three times.

5. The PET-data correction method according to claim 1, wherein the scattering features further comprise a scattering spatial range, and the processor classifying the scattering event based on the scattering features comprises:
the processor classifying the scattering event as a short-distance scattering event or a long-distance scattering event based on the scattering spatial range.

6. The PET-data correction method according to claim 5, wherein the processor classifying the scattering event as the short-distance scattering event or the long-distance scattering event based on the scattering spatial range, comprises:
if the scattering spatial range of the scattering event is within a preset scattering range, the scattering event is classified as the short-distance scattering event; and
if the scattering spatial range of the scattering event is not within the preset scattering range, the scattering event is classified as the long-distance scattering event.

7. The PET-data correction method according to claim 1, wherein the scattering features comprise the maximum point-deposited-energy, and the processor classifying the scattering event based on the scattering features comprises:
the processor classifying the scattering event as a high-energy scattering event or a low-energy scattering event based on the maximum point-deposited-energy.

8. The PET-data correction method according to claim 7, wherein the processor classifying the scattering event as the high-energy scattering event or the low-energy scattering event based on the maximum point-deposited-energy, comprises:
if a maximum point-deposited-energy of the scattering event is greater than a preset deposited energy, the scattering event is classified as the high-energy scattering event; and
if the maximum point-deposited-energy of the scattering event is less than or equal to the preset deposited energy, the scattering event is classified as the low-energy scattering event;
wherein the maximum point-deposited-energy is energy of the scattering point with a maximum deposited energy during an y photon scattering.

9. The PET-data correction method according to claim 1, wherein the scattering features comprise the time distribution of scattering points, and the processor classifying the scattering event based on the scattering features:
the processor classifying the scattering event as a long-interval scattering event or a short-interval scattering event based on the time distribution of scattering points.

10. The PET-data correction method according to claim 1, wherein after the processor obtaining the scattering features of the scattering event, the method further comprises:
the processor performing a scattering restoration for the scattering event.

11. A PET-image reconstruction method, comprising:
the processor obtaining the scattering event and the non-scattering event, which are corrected by using the PET-data correction method of claim 1;
the processor obtaining a coincidence event based on the corrected scattering event and the corrected non-scattering event; and
the processor reconstructing the coincidence event according to the scattering features to obtain the PET image.

12. The PET-image reconstruction method according to claim 11, wherein, during the processor reconstructing the coincidence event according to the scattering features, a reconstruction parameter of the scattering event is different from a reconstruction parameter of the non-scattering event, and a reconstruction parameter of the scattering event of each different classification is different.

13. The PET-data correction method according to claim 1, wherein the processor correcting the scattering event according to the second correction parameter, comprises:
the processor correcting the scattering event by the second correction parameter obtained based on a single scattering feature; or
the processor correcting the scattering event by using two or more second correction parameters at the same time.

* * * * *